United States Patent Office 2,978,467
Patented Apr. 4, 1961

2,978,467

NITRO KETO ALCOHOLS AND ESTERS

Karl Klager, Monrovia, Calif., assignor to Aerojet-General Corporation, Azusa, Calif., a corporation of Ohio No Drawing. Filed Jan. 22, 1957, Ser. No. 635,549

20 Claims. (Cl. 260—404.5)

This invention relates to a new class of keto alcohols and in particular is concerned with keto alcohols containing nitro groups. The keto alcohols of this invention may be illustrated by the general formula:

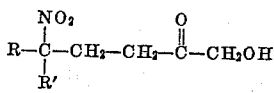

wherein R and R' may be the same or different and are radicals selected from the group consisting of nitro, halo, nitroalkyl, alkyl, cycloalkyl, aryl, aralkyl and lower alkylene carbalkoxy radicals having the general formula: lower alkyl—OOC—lower alkylene—.

This application is a continuation-in-part of my copending U.S. patent application Serial No. 377,687, filed August 31, 1953, and now abandoned.

The keto alcohols of this invention are prepared by condensing hydroxy methyl vinyl ketone with a compound having an activated hydrogen atom, that is a compound having hydrogen bonded to a tertiary carbon atom, in the presence of a suitable condensation catalyst such as sodium hydroxide or a mixture of sulfuric acid and mercuric sulfate.

The reaction proceeds in accordance with the general reaction scheme set forth below wherein R and R' are the same as defined above.

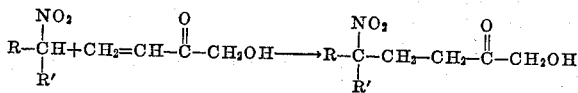

Hydroxymethyl vinyl ketone can be prepared by the method of Reppe, described in Acetylene and Carbon Monoxide Chemistry by Bigelow and Copenhaver, Reinhold Publishing Co., New York, N.Y., 1949.

The particular condensation catalyst employed is not a critical element of this invention and while better yields are obtained when the reaction is carried out in the presence of such catalysts, their presence is, nevertheless, not a critical limitation.

The keto alcohols of this invention can be reduced to form diols which are valuable intermediates in the preparation of explosives and propellant compositions. The diols prepared in this manner readily condense with polybasic acids or the like so as to form high molecular weight polymers which have been found to be useful as propellants and explosives.

The conversion of the keto alcohols of this invention to diols, and the use of such diols, is more fully disclosed in assignee's copending U.S. patent application Serial No. 628,950, filed December 12, 1956.

The following examples are provided to more clearly define the invention.

EXAMPLE I

*Preparation of 5,5,5-trinitro-2-keto pentanol*

In an Erlenmeyer flask, 3 gms. nitroform were dissolved in 10 ml. water and 30 ml. of a 4% solution of hydroxymethyl vinyl ketone was added dropwise over a period of 10 minutes. As a catalyst, 2 drops of 20% aqueous sodium hydroxide solution was added. The temperature was kept at 25° C. and was raised only slightly during the reaction. The mixture was allowed to stand for three days; then the solution was extracted three times with ether, and the ether solution was washed with a mixture of saturated sodium chloride solution and sodium bicarbonate solution. The ether solution was dried over sodium sulfate, and evaporated. The crystalline residue of 5,5,5-trinitro-2-keto pentanol was decolorized with charcoal in isopropyl ether solution. The addition of hexane caused crystallization, M.P. 77° C.

*Analysis.*—Calc'd for $C_5H_7N_3O_8$: percent C, 25.32; percent H, 2.98; percent N, 17.72. Found: percent C, 25.78; percent H, 2.76; percent N, 16.84.

EXAMPLE II

*Preparation of 5,5,5-trinitro-2-keto-pentanol*

A 1000-ml. three-necked flask provided with dropping funnel, thermometer, capillary tube, and distillation adapter connected to a condenser and receiver was charged with a solution of 40 gms. 2-butyne-1,4-diol (technical), 400 ml. water, 2.8 gms. conc. sulfuric acid, and 2.4 gms. mercuric sulfate. The mixture was heated to 50-52° C.; the temperature was regulated by applying a vacuum of 100-120 mm. After one hour, the small amount of distillate was returned to the receiver, and 10 gms. sodium acetate were added to adjust the pH to 5. In the meantime, another 100-ml. three-necked flask provided with a stirrer, dropping funnel, and thermometer was charged with 30 gms. nitroform, 100 ml. water, and 1 ml. of 20% aqueous sodium hydroxide solution. Then the solution of the isomerized 2-butyne-1,4-diol was added to the nitroform solution within a five-minute period while the temperature was maintained below 20° C., by means of external cooling. After a short time, crystals precipitated. The stirring was continued for 2 hours, then 300 ml. methylene chloride was added, and the water phase was extracted again with 200 ml. methylene chloride. The combined methylene chloride solutions were washed once with a mixture of 100 ml. saturated sodium chloride solution and 20 ml. saturated sodium bicarbonate solution; then again with 100 ml. saturated sodium chloride solution. After drying over sodium sulfate, the methylene chloride solution was concentrated in vacuum until crystallization occurred, which was completed by adding hexane and cooling. The crystals were collected and washed with hexane. The yield was 40 gms., M.P. 77° C. The product gave no melting-point depression with the compound described in the above paragraph and was identified as 5,5,5-trinitro-2-keto-pentanol.

EXAMPLE III

*Preparation of 5,5-dinitro-2-keto-hexanol*

A three-necked flask provided with a Claisen head, thermometer, dropping funnel, and capillary tube was charged with 40 gms. 2-butyne-1,4-diol, 400 ml. water, 2.8 gms. conc. sulfuric acid and 2.4 gms. mercuric sulfate. The Claisen head was connected in series to a condenser and receiver. A vacuum of 120 mm. was applied (by regulating pressure with the capillary tube) and the flask was heated to 50-52° C. At this temperature, the Meyer-Schuster rearrangement occurred and the hydroxymethyl vinyl ketone distilled. Two hundred ten ml. of the aqueous solution obtained was added to 12.1 gms. 2,2-dinitroethane dissolved in 50 ml. water and 4.2 gms. sodium hydroxide. The mixture was stirred for 2.5 hours at temperatures below 30° C. After cooling to 10° C., the solution was extracted with ether; the ether solution was dried over sodium sulfate and evaporated to yield 7.8 gms. of product. The 2-keto-5,5-dinitro-1-hexanol was purified by high vacuum distillation at 120–130° C. air-bath temperature and 1 micron pressure; then recrystallized from ether and redistilled under high vacuum, M.P. 26–28° C.

*Analysis.*—Calc'd for $C_6H_{10}O_6N_2$: percent C, 34.95; percent H, 4.89; percent N, 13.59. Found: percent C, 35.67; percent H, 5.22; percent N, 13.65.

EXAMPLE IV

*Preparation of 5-nitro-5-methyl-2-keto-hexanol*

A three-necked flask provided with a thermometer, distillation adapter, capillary tube and dropping funnel was charged with 86 gms. 2-butyne-1,4-diol, 860 ml. water, 5.6 gms. mercuric sulfate and 6.5 gms. conc. sulfuric acid. The isomerization was carried out at 100 mm. vacuum and 50–52° C. 20 gms. sodium acetate were added. The neutralized solution was added to a well stirred mixture of 2-nitropropane and 200 ml. water. A dilute solution of sodium hydroxide in water was added until a distinct color change occurred. The temperature rose to 33° C. and stirring was continued for 90 minutes. Then the solution was extracted twice with 500 ml. methylene dichloride. The extract was dried over sodium sulfate, filtered and then concentrated. The remaining oil was dried in vacuum until no more solvent distilled over. The honey colored residue obtained had a refractive index $n_D^{25}=1.4752$, and was identified as 5-nitro-5-methyl-2-keto-hexanol.

EXAMPLE V

*Preparation of 5,5-dinitro-2-keto-heptanol*

26 gms. 2-butyne-1,4-diol, 261 ml. water, 2 gms. mercuric sulfate and 2.4 gms. sulfuric acid, were isomerized in 100 mm. vacuum at 50–52° C. The solution was neutralized with 7.5 gms. sodium acetate and added to a well stirred mixture of 13.4 gms. 1,1-dinitropropane in 50 ml. water. Addition of few drops of 20% sodium hydroxide as a catalyst caused color change. The temperature rose to 31° C. The mixture was stirred 60 minutes; then the solution was extracted with methylene chloride, the extract dried over sodium sulfate, filtered and concentrated. The remaining light colored oil weighed 4.7 gms, and had a refractive index $n_D^{25}=1.4752$ and was identified as 5,5-dinitro-2-keto-heptanol.

EXAMPLE VI

*Preparation of 5,5-dinitro-2-keto-octanol*

A neutralized solution of hydroxymethyl vinyl ketone, as obtained in Example II, was added to 14.6 gms. 1,1-dinitro-butane in 50 ml. water, the temperature rose to 31° C. after addition of a few drops dilute sodium hydroxide. After 60 minutes stirring, the solution was extracted, the extract dried, filtered and concentrated. The concentrate dried at 50° C. at 1 mm. yielded 4.2 gms. 5,5-dinitro-2-keto-octanol with a refractive index $n_D^{25}=1.4650$.

EXAMPLE VII

*Preparation of methyl-8-hydroxy-7-keto-4,4-dinitro-octanoate*

The solution obtained by isomerization of 86 gms. 2-butyne-1,4-diol, 860 ml. water, 5.6 gms. mercuric sulfate and 6.3 gms. concentrated sulfuric acid were neutralized with 20 gms. sodium acetate. 75 gms. sodium salt of methyl 4,4-dinitrobutyrate were dissolved in 200 ml. water and stirred, while the solution of hydroxymethyl vinyl ketone was added. The temperature rose up to 32° C. The mixture was stirred for 1½ hours, then extracted with methylene chloride. The extract was dried with sodium sulfate, filtered and the solvent completely distilled off. The residue was 15.2 gms. of methyl-8-hydroxy-7-keto-4,4-dinitrooctanoate, having a refractive index of $n_D^{25}=1.4810$.

EXAMPLE VIII

*Preparation of 5-nitro-5-chloro-2-keto-hexanol*

The amount of hydroxymethyl vinyl ketone as obtained in Example VII was neutralized with 20 gms. sodium acetate and added to 35 gms. 1-chloro-1-nitroethane in 150 ml. water. A few drops of sodium hydroxide (20% aqueous solution) were added as a catalyst. The mixture was stirred for 60 minutes and then extracted with methylene dichloride. The extract was dried and filtered and the solvent distilled off. Yield: 28 gms., $n_D^{25}=1.4876$. The product was identified as 5-nitro-5-chloro-2-keto-hexanol.

EXAMPLE IX

*Preparation of 5-nitro-5-cyclohexyl-2-keto-hexanol*

The solution of hydroxymethyl vinyl ketone as obtained in Example VII was neutralized with 20 gms. sodium acetate and added to a suspension of 45 gms. nitrocyclohexane in 150 ml. water. Addition of few drops 20% aqueous sodium hydroxide caused color change and temperature rise to 31° C. After 60 minutes stirring, the solution was extracted with methylene chloride. The extract was dried, filtered and the solvent evaporated. The residue was distilled until no more nitrocyclohexane distilled over. The residue was 5-nitro-5-cyclohexyl-2-keto-hexanol, weighed 7 gms. and had a refractive index $n_D^{25}=1.4882$.

Thus, it is evident that any organic compound possessing an activated hydrogen atom may be utilized according to the procedures outlined in the above examples to prepare the keto alcohols of this invention.

Such activated hydrogen containing compounds as: nitro-substituted alkyls, cycloalkyls, alcohols, ethers, esters, acids, arylalkyls, ketones, aldehydes, and the corresponding halo substituted nitro compounds having hydrogen bonded to a tertiary carbon atom can be readily condensed with hydroxymethyl vinyl ketone, under the conditions set forth above, to yield the desired keto alcohols of the present invention. For example, 2-keto-5,5,7,7-tetranitro-1-octanol; 2-keto-5-bromo - 5 - nitro-1-hexanol; 2-keto-5-cyclopentyl-5-nitro-1-hexanol; 2-keto-5,5,7-trinitro-1-heptanol; and 2-keto-5-methyl-5,7,7-trinitro-1-octanol can be prepared by reacting hydroxymethyl vinyl ketone with 1,1,3,3-tetranitrobutane; 1-bromo-1-nitroethane; 1-cyclopentyl-1-nitroethane; 1,1,3-trinitropropane; and 1-methyl-1,3,3-trinitrobutane, respectively, in accordance with the method disclosed above. It will be appreciated that any member of this class of compounds can be prepared simply by reacting appropriate starting materials in accordance with my invention.

It should be understood that the above examples are provided in an illustrative sense only and are not intended to impose any limitations upon the invention.

I claim:

1. As new compositions of matter, the keto-alcohols having the general formula:

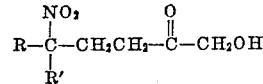

wherein R and R' are radicals selected from the group consisting of nitro, lower nitroalkyl, halo, lower alkyl, monocycloalkyl and lower alkylene carbalkoxy radicals.

2. As a new composition of matter, 5,5,5-trinitro-2-keto-pentanol having the formula:

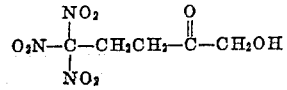

3. As a new composition of matter, 5,5-dinitro-2-keto-hexanol having the general formula:

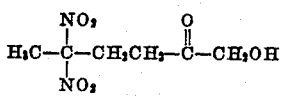

4. As a new composition of matter, 5,5-dinitro-2-keto-heptanol having the general formula:

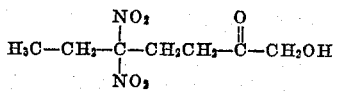

5. As a new composition of matter, 5,5-dinitro-2-keto-octanol having the general formula:

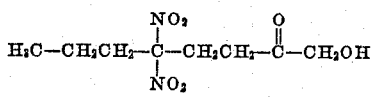

6. As a new composition of matter, 5-nitro-5-chloro-2-keto-hexanol having the formula:

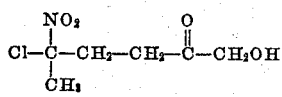

7. As a new composition of matter, 5-nitro-5-methyl-2-keto-hexanol having the formula:

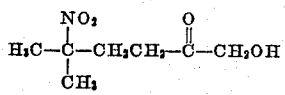

8. As a new composition of matter, methyl-8-hydroxy-7-keto-4,4-dinitro-octanoate having the formula:

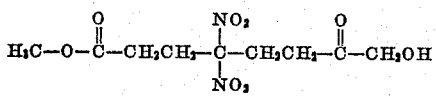

9. As a new composition of matter, 5-nitro-5-cyclohexyl-2-keto-hexanol having the formula:

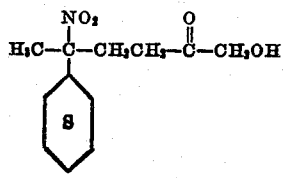

10. A new method of preparing nitro-substituted keto-alcohols which comprises condensing hydroxy methyl vinyl ketone with a nitro compound having the general formula:

wherein R and R' are radicals selected from the group consisting of nitro, halo, lower alkyl, lower nitroalkyl, monocycloalkyl and lower alkylene carbalkoxy radicals.

11. The method of claim 10 wherein a condensation catalyst is present during the reaction.

12. The method of claim 10 wherein the condensation is conducted in the presence of aqueous sodium hydroxide.

13. A method of preparing 5,5,5-trinitro-2-keto-pentanol which comprises condensing trinitro methane with hydroxy methyl vinyl ketone.

14. A method of preparing 5,5-dinitro-2-keto-hexanol which comprises condensing 1,1-dinitro ethane with hydroxy methyl vinyl ketone.

15. A method of preparing 5,5-dinitro-2-keto-heptanol which comprises condensing 1,1-dinitro propane with hydroxy methyl vinyl ketone.

16. A method of preparing 5,5-dinitro-2-keto-octanol which comprises condensing 1,1-dinitro butane with hydroxy methyl vinyl ketone.

17. A method of preparing 5-nitro-5-chloro-2-keto-hexanol which comprises condensing 1-chloro-1-nitroethane with hydroxy methyl vinyl ketone.

18. A method of preparing 5-nitro-5-methyl-2-keto-1-hexanol which comprises condensing 2-nitro-propane with hydroxy methyl vinyl ketone.

19. A method of preparing methyl-8-hydroxy-7-keto-4,4-dinitro octanoate which comprises condensing methyl 4,4-dinitro butyrate with hydroxy methyl vinyl ketone.

20. A method of preparing 5-cyclohexyl-2-keto-5-nitro-1-hexanol which comprises condensing 1-nitro-1-cyclohexyl ethane with hydroxy methyl vinyl ketone.

No references cited.